United States Patent [19]

Gumbert et al.

[11] Patent Number: 5,295,405

[45] Date of Patent: Mar. 22, 1994

[54] DEVICE HAVING A PLATE WITH MULTIPLE COOPERATING MOVING PARTS INJECTION MOLDED THEREON

[75] Inventors: Hans Gumbert, Sinn; Norbert Kunze, Ehringshausen; Georg Weber, Lohra-Weipoltshausen, all of Fed. Rep. of Germany

[73] Assignee: U.S. Philips Corporation, New York, N.Y.

[21] Appl. No.: 878,653

[22] Filed: May 5, 1992

Related U.S. Application Data

[60] Continuation-in-part of Ser. No. 895,573, Jun. 8, 1992, Pat. No. 5,179,358, which is a division of Ser. No. 573,430, Aug. 23, 1990, which is a continuation-in-part of Ser. No. 507,947, Apr. 10, 1990, abandoned.

[30] Foreign Application Priority Data

May 17, 1991 [DE] Fed. Rep. of Germany ....... 4116143

[51] Int. Cl.$^5$ .................. F16H 21/44; F16H 1/04
[52] U.S. Cl. .................... 74/99 R; 74/102; 74/104; 74/109; 74/422
[58] Field of Search .............. 74/422, 89.17, 109, 74/120, 29, 102, 104, 105, 99 R

[56] References Cited

U.S. PATENT DOCUMENTS

| 2,705,346 | 4/1955 | Schlabach et al. |
|---|---|---|
| 3,214,504 | 12/1962 | Gemberling . |
| 3,656,364 | 4/1972 | Cable et al. ............... 74/422 |
| 3,785,217 | 1/1974 | Peura . |
| 3,840,065 | 10/1974 | Hannes . |
| 3,941,495 | 3/1976 | Duncan . |
| 4,158,450 | 6/1979 | Suzuki . |
| 4,502,034 | 2/1985 | Endo et al. . |
| 4,546,695 | 10/1985 | Ouchi et al. . |
| 4,574,786 | 3/1986 | Hashimoto et al. ........... 74/89.18 X |
| 4,796,120 | 1/1989 | Komatsu et al. . |
| 5,058,446 | 10/1991 | Guey ............................... 74/89.17 |
| 5,099,714 | 3/1992 | Hutchison ........................... 74/422 |

FOREIGN PATENT DOCUMENTS

| 0392600 | 4/1990 | European Pat. Off. . |
|---|---|---|
| 03926010 | 4/1990 | European Pat. Off. . |
| 1055892 | 4/1959 | Fed. Rep. of Germany . |
| 2709213 | 9/1978 | Fed. Rep. of Germany ........ 74/422 |
| 62-162272 | 7/1987 | Japan . |

Primary Examiner—Rodney H. Bonck
Assistant Examiner—David W. Laub
Attorney, Agent, or Firm—Brian J. Wieghaus

[57] ABSTRACT

A technical device, in particular an electromechanical running gear for the movement of information carriers, such as magnetic tapes or discs, having a carrier plate (1) made of metal at which movable functional parts (5, 7) made of synthetic resin are formed by an injection molding process (outsert molding). Each functional part is held in a respective hole (3, 4) in the plate by means of retaining pieces (5a, 5b, 7, 7c) made of synthetic resin which overlie both plate surfaces (1c, 1d). The retaining pieces are interconnected through the hole by an integral synthetic-resin connection bridge (5b, 7b) integral with these pieces. Clearance sufficient to obtain a smooth movement of the functional parts (5, 7) in the holes (3, 4) is obtained through mechanical deformation of the retaining pieces subsequent to the insertion molding. The holes 3, 4 are formed such that the parts 5, 7 may be outsert molded with the parts free of contact with each other yet moveable after molding into continuous engagement with each other.

5 Claims, 5 Drawing Sheets

DEVICE HAVING A PLATE WITH MULTIPLE COOPERATING MOVING PARTS INJECTION MOLDED THEREON

CROSS-REFERENCE TO RELATED APPLICATIONS

This is a continuation-in-part of U.S. application Ser. No. 07/895,573 filed Jun. 8, 1992 of Hans Gumbert which discloses and claims a method of obtaining moveability of plastic part outsert molded in a metal plate, and which is a division of U.S. Ser. No. 07/573,430 filed Aug. 23, 1990 which is a continuation-in-part of U.S. Ser. No. 07/507,947 filed Apr. 10, 1990 (now abandoned).

BACKGROUND OF THE INVENTION

The invention relates to a technical device, in particular an electromechanical running gear for the movement of information carriers, such as magnetic tapes or discs, comprising a carrier plate made of metal at which movable functional parts made of synthetic resin are formed by an injection moulding process (outset molding), each of which parts being held in the region of at least one hole in the plate by means of retaining pieces made of synthetic on both plate surfaces, these retaining pieces being interconnected through the hole by means of a synthetic-resin connection bridge integral with these pieces, while the portions of the retaining pieces of synthetic resin covering the hole edges enclose the covered plate portions with a clearance which is obtained through subsequent mechanical deformation of the functional parts, which clearance corresponds to the movability of a plain bearing.

Such a technical device is known from, for example, EP 0 392 600 A2. In a plastic injection molding process (outsert moulding process), functional parts are formed at metal plates, each of which parts is held on both plate surfaces in the area of at least one plate hole by means of retaining pieces of synthetic resin, these pieces being interconnected through the hole by means of a synthetic-resin connection bridge which is integral with these pieces. When the bridges are round, there is a possibility, in the case of a single-bridge fastening, for the functional parts to be rotated after injection moulding. This rotation, however, can only be achieved with difficulty and only a few times. It is described in EP 0 392 600 A2 how such fastenings can be made movable in such a way that plain bearing characteristics are obtained. This is achieved in that the portions of the retaining pieces of synthetic resin covering the hole edges enclose the covered plate portions with a clearance obtained through subsequent mechanical deformation of the portions, corresponding to the movement possibility of a plain bearing. This clearance is achieved by means of a subsequent deformation.

JP 62-162.272 discloses two separately injection-moulded functional parts which are so formed that they can be brought into mutual engagement by an adjustment after injection moulding. The function obtained after the engagement has been achieved, however, is only a static one.

SUMMARY OF THE INVENTION

The invention has for its object to improve the technical device of the kind mentioned in the opening paragraph with injection-moulded functional parts which are rotationally and translationally movable by means of further assembling simplifications.

According to the invention, this object is achieved in that several functional parts formed separately at a plate and rendered movable after being formed constitute multiple movable drive units after being brought into mutual engagement.

When the functional parts are injection moulded in a mutually coordinated arrangement which renders subsequent functional interconnections possible, further assembling work is rendered redundant.

A first embodiment of the invention is characterized in that one functional part is a slide constructed as a rack and the other functional part is a pinion, together forming a rack and pinion system when the slide formed laterally of the pinion is shifted into the operational range of the pinion. The hole for the functional part constructed as a rack need only be so long that the pinion and the rack do not touch one another in the injection moulding process. When later the rack is shifted into the range of the pinion after the deformation operation is performed on rack and pinion, the rack and pinion form a drive which can be used in the device in the same way as a hand-mounted rack and pinion drive.

Another embodiment of the invention is so arranged that a functional part constructed as a slide and a functional part constructed as a lever with a lever arm are interconnected so as to form a lever linkage in that a carrier pin of the lever arm is subsequently snapped into a carrier slot of the slide. Since the two functional parts are injection moulded from synthetic resin, the lever arm can be elastically deformable. This renders it possible to snap the carrier pin on the separately injection-moulded part into the slide after the deformation operation has been carried out, and thus to form a lever linkage.

In a third embodiment of the invention it is arranged that several functional parts are designed at least partly for transmitting movements through the carrier plate, and in that the functional parts of each of at least two plates arranged at a distance one above the other in a layered structure and carrying functional parts are in force-transmitting engagement with the functional parts of the respective other carrier plate between said carrier plates. The individual carrier plates are in this case individually injection moulded and subsequently put one over the other, so that a transmission is created in the layered structure. It is rendered possible by means of several layers to form a complicated transmission in a very constricted space, in which no individual gearwheels are mounted, but only plates treated by the synthetic-resin injection moulding process are stacked one on the other.

A further modification of the third embodiment of the invention is so arranged that spacer members are provided for keeping a distance between the carrier plates, which spacer members are each injection moulded to a carrier plate so as to be immovable and carry fastening means which are so constructed that they can be snapped into the respective other plate, the fastening means being capable of snapping into a sleeve of the other carrier plate, which sleeve is injection moulded to the other carrier plate so as to be immovable. According to a further modification of the third embodiment of the invention, at least those functional parts which are situated between the carrier plates are constructed as gears, forming a gear transmission which converts rotational drive movements transmitted from the exterior and transmits them to the exterior again as rotational drive movements. The spacer members themselves are then components of the carrier plates and lock the plates relative to one another when they are joined together, maintaining the predetermined plate interspacing.

According to a further embodiment of the invention, a hole is formed in one of the covering portions during injection moulding, which hole is in alignment with a hole in the carrier plate, while in the case of several functional parts to be brought into mutual engagement the aligned holes in the covering portions and in the carrier plate are provided in such a way that the teeth neatly mesh when the carrier plates with aligned holes are joined together. If centering pins are inserted into the aligned holes during assembly, all gears will be in the correct position at the moment of assembly, so that the plates may be joined together practically blindly. Automatic mounting of the plates one onto the other is rendered perfectly possible in this way. To facilitate the movement, an additional lubricant is provided in many bearings. This lubricant is introduced either automatically through lubrication nipples or by hand. To save operational steps also in this respect, it is provided that a lubricant lining is provided in the region of the connection bridge between the covering portions towards the edge of the carrier plate, the lubricant lining being provided during the injection moulding process in the mould. The lubricant lining, accordingly, is already present after injection moulding and is capable of performing the lubrication function after the deformation operation.

A further embodiment of the invention is so arranged that bearing bushes are provided in the mould during the injection moulding process, which bushes are joined to the connection bridges during injection moulding so as to enclose the latter. A modification of this embodiment may be so constructed that bearing material is provided in the mould during the injection moulding process, which material is joined to the connection bridges during injection moulding so as to enclose the latter. In this case the bearing bushes with the movable bridges run in the edges of the holes of the carrier plates.

An alternative embodiment is also conceivable, however, in injection moulding technology whereby the bearing bush or a bearing material is provided in the mould during the injection moulding process and is injected into a sleeve so as to be immovable therein, the sleeve being injected into the hole of the carrier plate. In this case, the bearing bush is fixed in the hole without rotation possibility. A further modification of the invention is then so arranged that the bearing bush is provided with lubrication grooves at its inner running surface, or that lubrication grooves are injected into the running surface of the bearing material during the injection moulding process. Bearing lubrication may also be achieved in a simple manner by this.

BRIEF DESCRIPTION OF THE DRAWINGS

The invention will be explained in more detail with reference to the drawing, in which.

DESCRIPTION OF THE PREFERRED EMBODIMENT

Figure 1A:
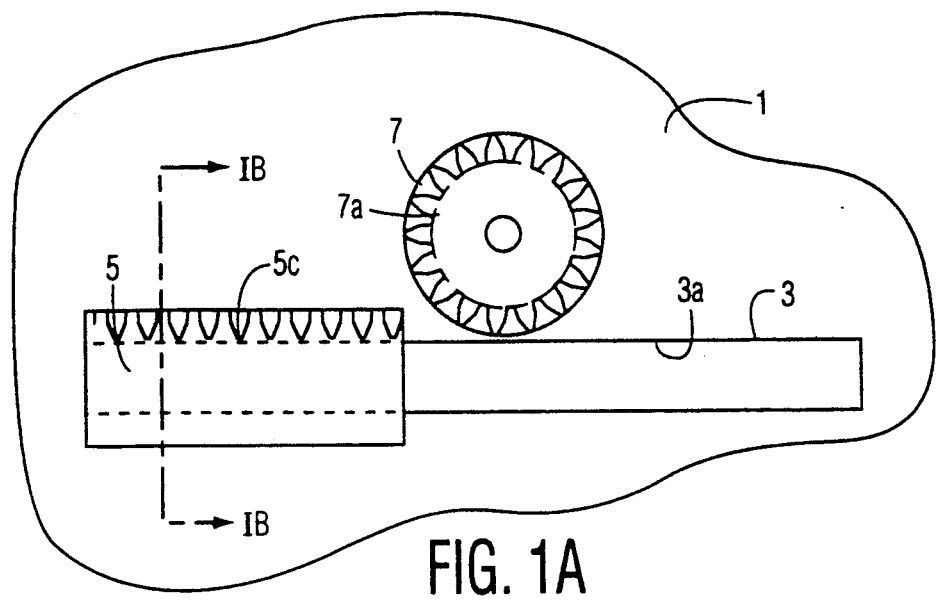
FIGS. 1a, 1b and 1c show a transmission consisting of several components, formed in one operation in an injection moulding process from synthetic resin, and acting as a rack and pinion.
Figure 1B:
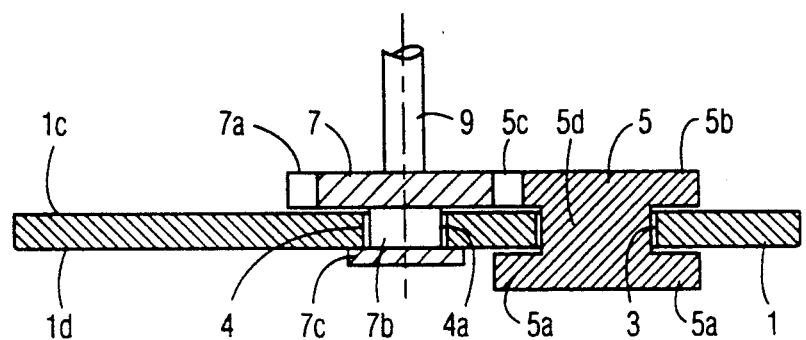
Figure 1C:
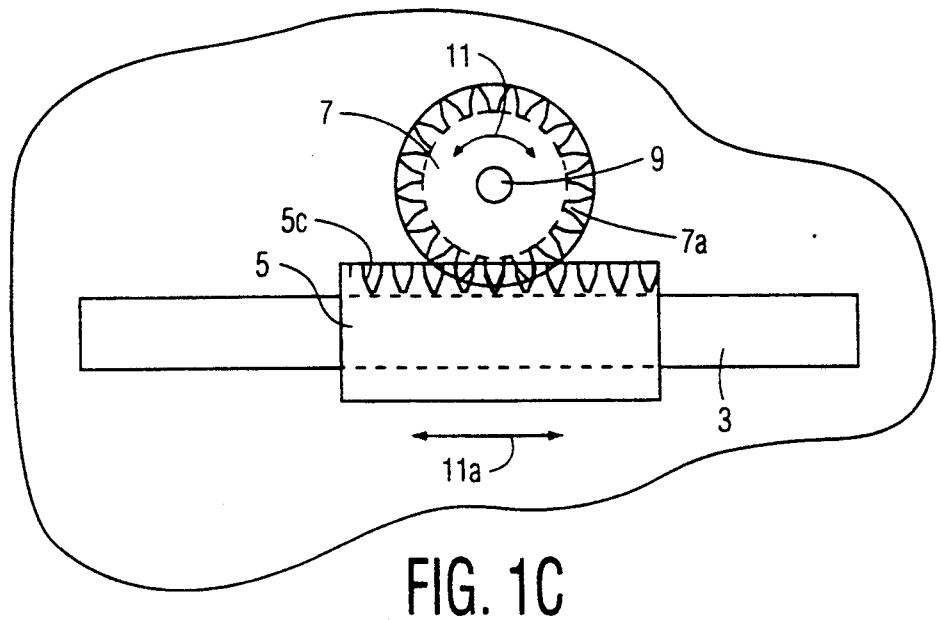

FIG. 1a shows a portion of a metal carrier plate 1 on which functional parts are formed by an injection moulding process (outsert moulding) from synthetic resin. The carrier plate 1 has a slot 3 onto which a slide 5 is injected by the injection moulding technology in synthetic resin. A pinion having teeth 7a is injected next to the slide 5 and next to the slot 3, which pinion can mesh with teeth 5c of the slide 5. FIG. 1b shows the device taken on the line IB—IB in FIG. 1a. The pinion 7 and the slide 5 are only seemingly in engagement; they are separated from one another, one behind the other. The slide 5 grips around the edges 3a of the slot 3 with retaining pieces 5a, 5b. A wide connection bridge 5d extending through the slot 3 interconnects the retaining pieces 5a, 5b at the upper and lower sides of the slide 5. The correspondingly constructed pinion 7 is provided with a connection bridge 7b which is passed through a round hole 4 with hole edges 4a. The pinion 7 lies over the edges 4a on the upper side 1c of the plate; the bridge 7b is provided with a collar 7c at the lower side 1d of the plate, which collar together with the pinion 7 and the bridge 7b encloses the edges 4a.

In the condition obtaining immediately after injection moulding, the functional parts 5, 7 can move only with difficulty. Therefore, the two functional parts 5, 7 are rendered movable in a deformation operation carried out from both sides of the plate.

In this deformation operation, a shaping ram is forced against the functional part in the direction of the axis of the connection bridge while the plate is suitably supported at one face by an abutment in the area about the retention piece. This deforms one of the retention pieces 7a, 7c. The other of the retention pieces is then deformed with a fore on the functional part in the opposite direction. The deformation of the two retention pieces 7a, 7c in this manner provides a greater clearance between these retention pieces than obtained from the injection molding process alone and facilitates movement of the function part in its respective opening. This deformation blow can be performed at various times, either while the molding is still in the injection mold, before removal from the mold, or outside the injection mold, immediately after removal from the mold. It is furthermore possible to perform the deformation blow after renewed heating up or, depending on the properties of the injection-molding material, even while the workpiece is cold.

Then the slide has been moved to the right, so that the teeth 5c and 7a come into engagement. Now the slide 5 can be moved in two opposite directions indicated by a double arrow 11a by the pinion 7 when the latter is rotated about its shaft 9 in the direction of a double arrow 11. Thus a rack and pinion transmission has been created ready for operation in one single injection moulding operation and a subsequent deformation.

FIGS. 2a to 2d show the formation of a lever linkage by the injection moulding technology in synthetic resin, parts of the lever linkage being formed in one injection moulding operation. The lever linkage comprises a slide 13 in which a transverse slot 15 is provided, and a lever 17 with a lever arm 19. The lever arm 19 is provided with a carrier pin 21.

The slide 13 and the lever 17 are injected onto the carrier plate 1 in one operation next to one another by the injection moulding technology (outsert moulding) from synthetic resin. It is apparent from FIG. 2b showing a cross-section taken on the line IIB—IIB in FIG. 2a that the slide 13 covers the edges 3a of the slot 3 with synthetic resin retaining pieces 13a, 13b after injection moulding. Similarly, synthetic resin retaining pieces 17a, 17b cover the edges 19a of a circular hole 20 through which a connection bridge 17c of the lever 17 is passed. The connection bridge connects the retaining pieces 17a and 17b and thus keeps the lever fixed on the carrier plate 1. Simultaneously, the connection bridge 17c connects the lever 17 with a shaft 22.

Figure 2A:
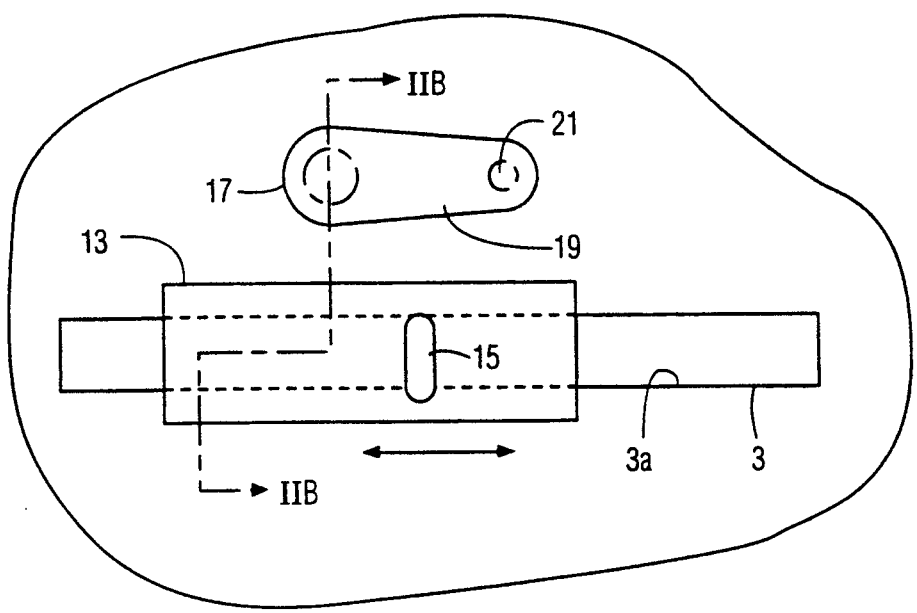
FIGS. 2a to 2d show a lever linkage formed in one operation in an injection moulding process from synthetic resin.
Figure 2B:
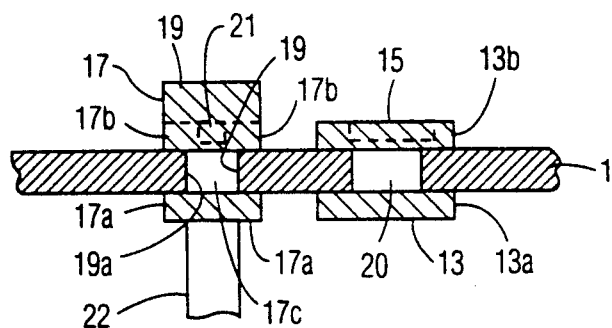
Figure 2D:
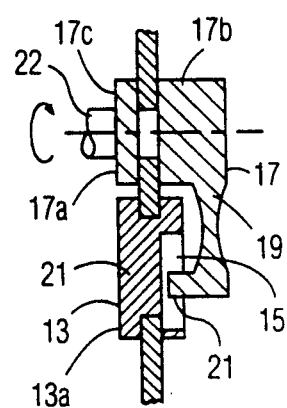
Figure 2C:
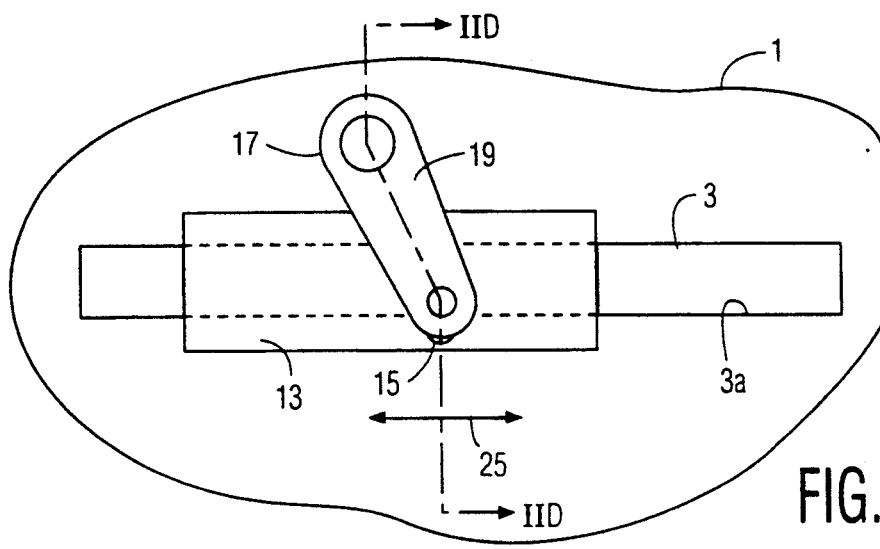

After the lever 17 and the slide 13 have been rendered slidable and rotatable in the slot 3 and the hole 21, respectively, by means of a deformation operation carried out from both plate sides 1a and 1c, the lever arm 19 is swivelled from the position shown in FIGS. 2a and 2b in clockwise direction, during which the lever arm 19 with the pin 21 is bent upwards. Swivelling continues until the carrier pin 21 enters the slot 15 of the slide 3. The lever linkage, which was originally injection moulded onto the carrier plate in one operation, is now ready for operation and the lever arm 21 is capable of moving the slide 13 in two opposing directions indicated by a double arrow 25 (plan view of FIG. 2c and cross-section of FIG. 2d).

Figure 3:
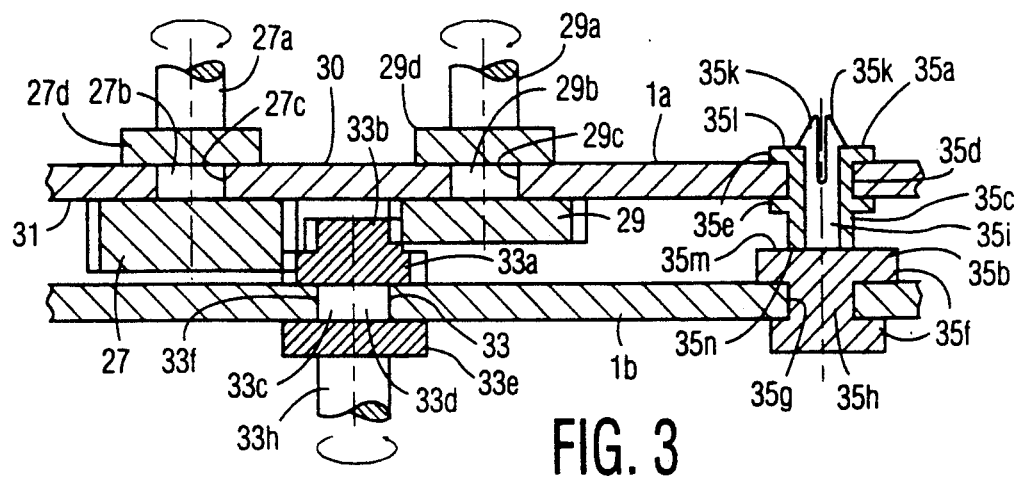
FIG. 3 shows a gear transmission formed by a metal-plastic moulding process in a multiple layer structure.

FIG. 3 shows a third embodiment of the technical device, which is suitable, for example, for a clockwork drive which can run extremely smoothly. Two carrier plates 1a and 1b are provided, which are manufactured independently of one another. Gears 27, 29 with spindles 27a and 29a are injection moulded onto the plate 1a, the spindles 27a and 29a being passed through circular holes 27c and 29c from the upper side 30 of the plate 1a to the other plate side 31 so as to form connection bridges 27b, 29b. Retaining flanges 27d and 29d together with the gears 27, 29 here hold the edges of the holes enclosed.

The second carrier plate 1b supports a double gear 33 having a major gear rim 33a and a minor gear rim 33b. A bridge 33d which is integral with a flange 33e is passed through the hole 33c of the carrier plate 1b. This flange 33e and the major gear 33a enclose the edges 33f of the hole 33c. After the carrier plates 1a and 1b have been injection moulded separately and the functional parts have been subjected to their deformation operations from both plate sides, the plates 1a, 1b are stacked together parallel in sandwich fashion, so that the gears come into engagement. A gear transmission is created in this manner, for example, with a drive pinion 27a and a driven pinion 29a. The intermediate gear 33 may alternatively be connected to a drive or driven pinion 33h, indicated in broken lines in FIG. 3.

Such a transmission can be flat and can run extremely smoothly. It is easy to assemble and can be used as a clockwork or switchgear, or also in general as a transmission gearing.

To obtain an accurately defined interspacing between the carrier plates 1a and 1b, spacer members 35a, 35b are provided, which cooperate with one another. The spacer member 35a, for example, consists of a bush 35c which is passed through a hole 35d of the carrier plate 1a and which encloses the hole edges with flanges 35e. This bush remains fixed against rotation on the plate 1a. The other spacer member 35b encloses the edges of a hole 35g with flanges 35f, which flanges are interconnected through the plates by means of a connection bridge 35h. The spacer member 35b carriers a locking pin 35i which can enter through the bush 35c. Detent hooks 35k at the free pin end can grip over a locking surface 33l of the flange 35e. An accurate interspacing between the plates 1a and 1b is provided in the case of an exactly defined height between a contact surface 35m of the spacer member 35b and an end face 35n of the bush 35c, when these plates are put one onto the other. The spacer members keep the plates fixed at the given interspacing after joining together. The assembly is simple and reliable.

Figure 4A:
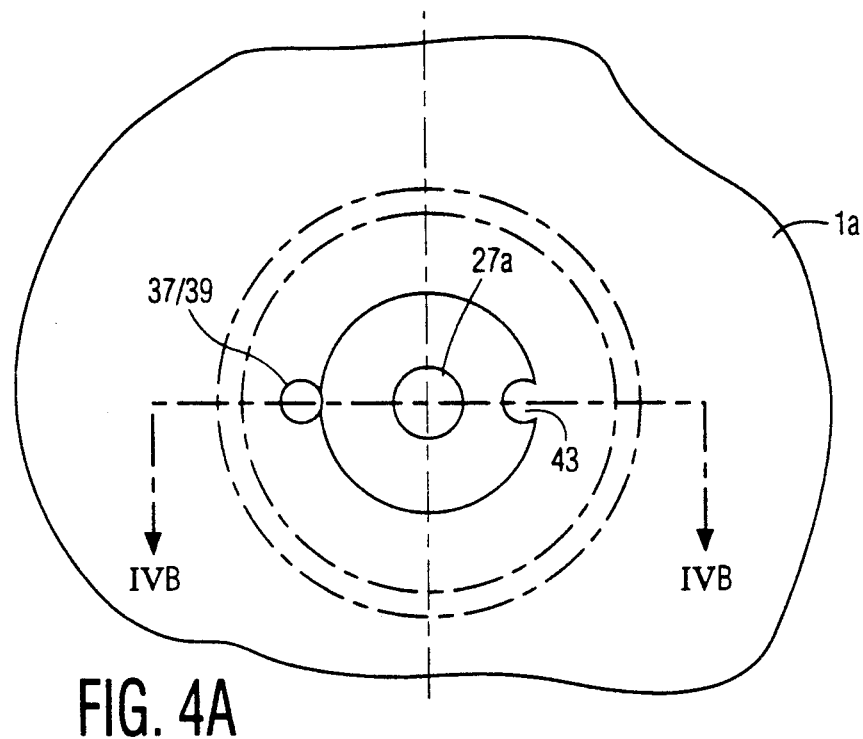
FIGS. 4a and 4b show a mounting aid and injected lubrication formed by the injection moulding technology.
Figure 4B:
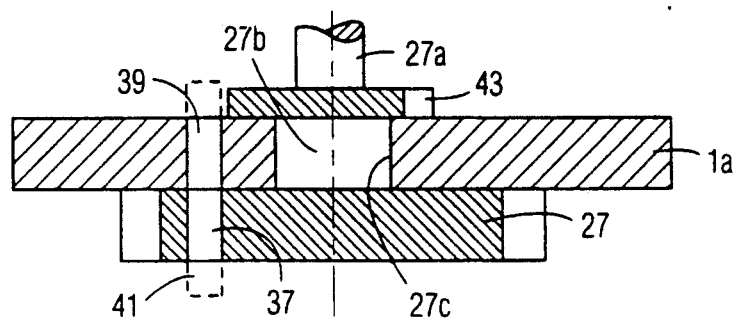

FIGS. 4a and 4b show how the assembly of a drive according to FIG. 3 can be facilitated. For example, during injection moulding of the gear 27 with its accompanying parts, a hole 37 extending parallel to the axial direction of the gear is kept open in the gear, in alignment with a hole 39 in the plate 1a. When during subsequent assembly of the gears, which have been made capable of rotation, such an aligned hole construction 37/39 is provided in all gears or all rotating parts, and when retention pins 41 are inserted into the holes during assembly, one of these pins being shown in FIG. 4b in broken lines, then the gears can be joined together with exact fit in a correct position of the holes 37, 39 when the plates 1a and 1b are moved together as shown in FIG. 3. Such an assembling aid renders it possible to mount a gear transmission according to FIG. 3 without errors. To improve the sliding quality of the bearings of the transmission according to FIG. 3, without the necessity of subsequent and additional lubrication operations, a lubricant lining 43 is provided in the flange 27d in the region of the connection bridge 27b. This lubricant lining can be ruptured during the deformation operation and thus release the lubricant into the bearing surfaces.

Figure 5:
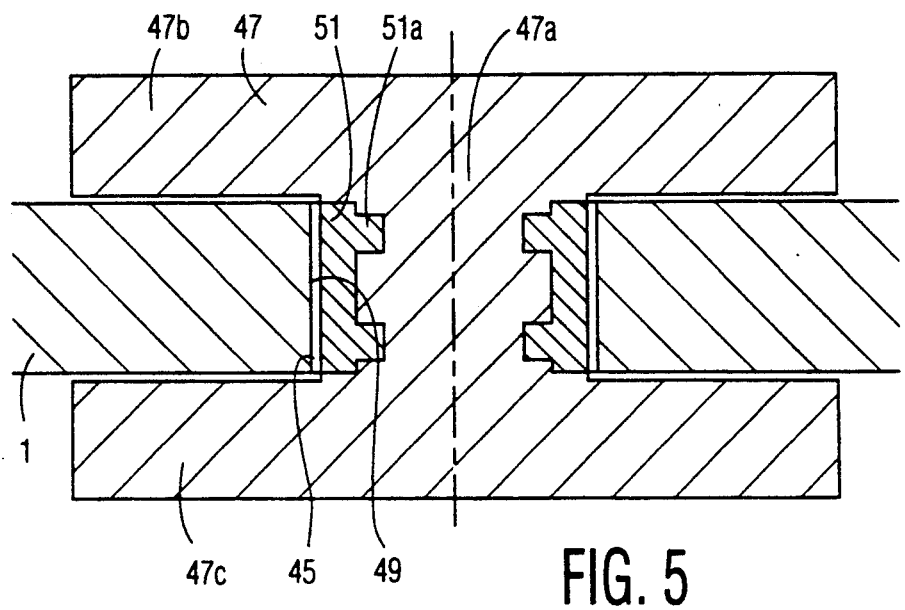
FIG. 5 shows an injected plain bearing with lubrication nipple.

The improvement of the sliding quality can also be achieved through injection of slidable parts. These slidable parts may then be connected either to the corresponding bridge of the functional part or to the edge of the hole of the carrier plate. FIG. 5 shows an embodiment in which the slidable material can be included in the moulded through the introduction of bearing bushes or bearing material. The embodiment applies in general to outsert bearing moulding technology. The carrier plate 1 has a circular hole 45 through which the bridge 47a of a functional part 47 extends. Retaining pieces 47b and 47c grip around the edges of the hole 45. Before outsert moulding of the carrier plate 1, either a bearing bush or a bearing material 15 was inserted into the injection moulding tool in the vicinity of the edges 49 of the hole 45. The bush may, for example, have inner grooves 51a. During injection moulding, the material of the bridge 47a is joined to the bearing material 51. An improved bearing is created in this manner which will run smoothly after the deformation operation impact.

Figure 6:
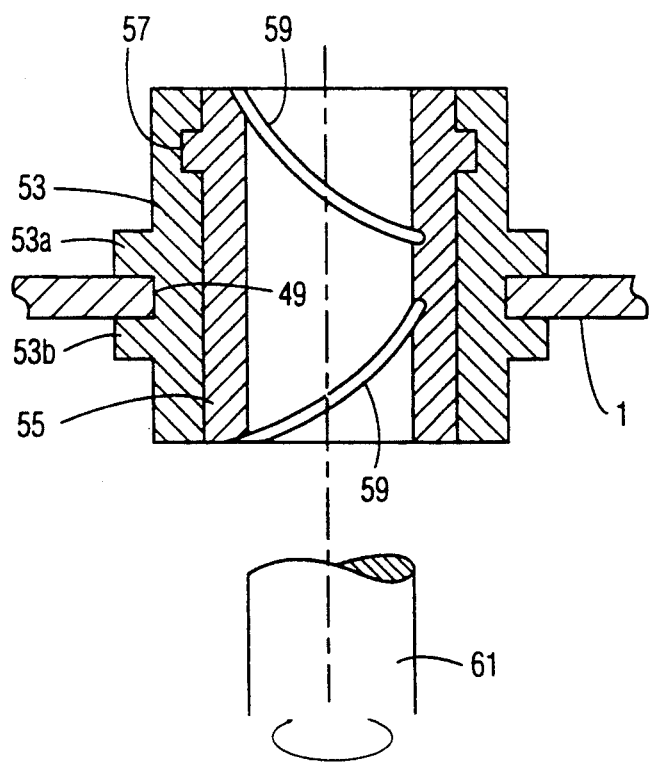
FIG. 6 shows an injected plain bearing and lubrication nipple with air bearing grooves.

FIG. 6 shows an embodiment in which the carrier plate 1 is provided with a sleeve 53 which encloses the hole edges 49 with flanges 53a, 53b. A bearing bush 55 is injection moulded into the sleeve 53. Outer projections 57 of the bearing bush may then enter the sleeve 53 and fix themselves therein. When the bearing bush 55 is provided with lubrication grooves 59 running in opposite directions on the inside, these grooves, when constructed in spiral shape as the grooves of an air bearing, can serve either as lubrication grooves or as an air bearing for a shaft 61 introduced into the bearing bush 55.

Figure 7:
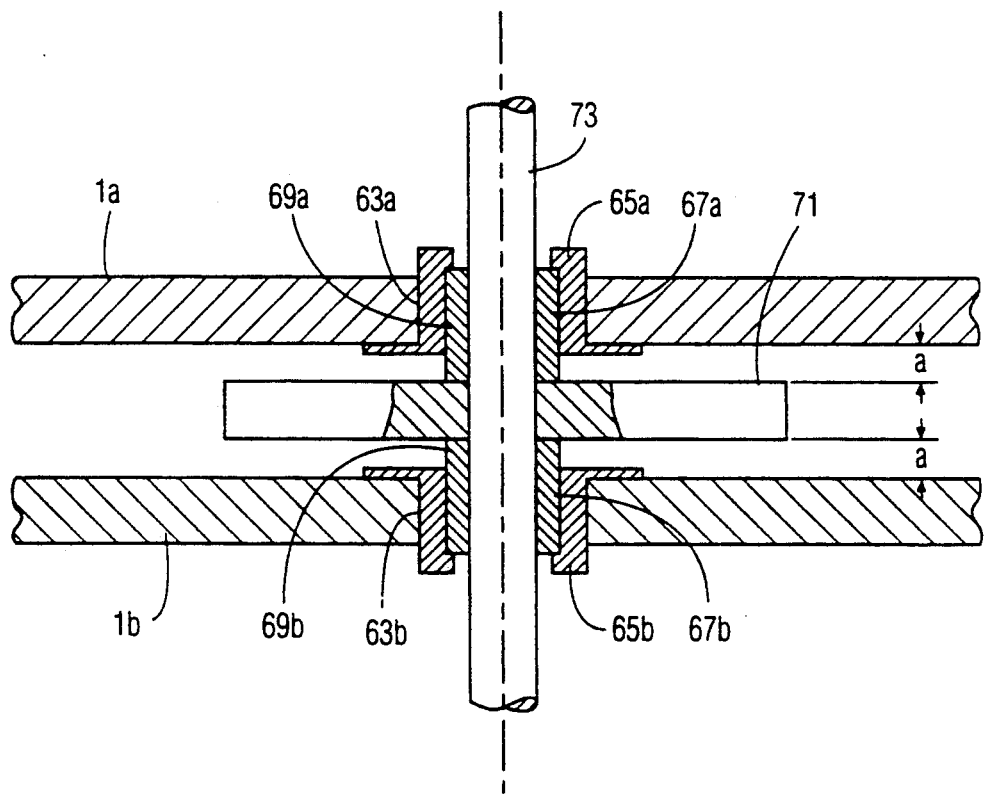
FIG. 7 shows a wheel bearing between two metal carrier plates.

FIG. 7 shows two carrier plates 1a and 1b which can be interconnected by means of spacer members 35a, 35b, as in the case in FIG. 3. Bearing sleeves 65a, 65b are provided in holes 63a, 63b of the plates 1a, 1b. Contact bushes 67a, 67b are provided in these bearing sleeves 65a, 65b by injection moulding, or are subsequently driven home therein. The mutually facing end surfaces 69a, 69b of the contact bushes 67a, 67b have an exactly defined distance to the corresponding plates 1a, 1b. When the plates 1a, 1b are now put one on the other, after a drive wheel 71 with a shaft 73 was introduced into one of the contact bushes 67a or 67b, the end surfaces 69a, 69b will align the drive wheel 71 to an exact distance relative to some further drive wheel, which is not depicted.

We claim:

1. A technical device, comprising:
   a metallic carrier plate having opposite faces and including a pair of spaced openings extending through said plate, said plate being integral and continuous about each of said openings, and
   a pair of functional parts each movable in a respective one of said openings and functionally engageable with each other, each functional part comprising a connection bridge extending through the respective said plate opening and a pair of opposing retaining pieces each overlying a respective plate face, said retaining pieces being spaced from said plate faces for non-removably retaining said functional part in said opening and such that said functional part is freely movable within said opening, said connection bridge and retaining pieces being comprised of an integrally molded synthetic resin material,
   one of said plate openings being shaped such that its respective functional part is moveable between a clearance position, in which said respective functional part has physical clearance with the other functional part, and another position in which the functional parts are continuously engageable with each other.

2. A technical device as claimed in claim 1, characterized in that one of said openings in said plate is an elongate slot and its functional part is a slide constructed as a rack and the other functional part is a pinion, together forming a rack and pinion system when said slide is shifted in said slot out of said clearance position into cooperation with the pinion.

3. A technical device as claimed in claim 1, characterized in that one of said openings in said plate is an elongated slot and its function part is a slide with a carrier slot and the other functional part is a lever with a lever arm having a carrier pin that is snapped into said carrier slot to form a lever linkage system to allow said slide to be shifted in said elongated slot by said lever.

4. An apparatus including a rack and pinion, said apparatus comprising:
   a metallic carrier plate having opposing faces and including a first opening and an elongate slot in said plate;
   a toothed pinion having a regular distribution of teeth about is periphery and rotatable in said first opening; and
   a toothed rack slidable in said slot; said toothed pinion and toothed rack each comprising a connection bridge extending through the respective one of said opening and slot in said plate and a pair of opposing retaining pieces each overlying a respective face plate, said retaining pieces being spaced from said opposing plate faces for non-removably retaining said pinion and rack in said opening and slot, respectively, and such that said pinion and rack are freely movable within said opening and slot said, connection bridge and retaining pieces being comprised of an integrally molded synthetic resin material,
   said opening and said slot being shaped such that said toothed pinion and toothed rack are moveable between a clearance position, in which said rack and pinion have physical clearance with each other, and an operating position in which the teeth of said pinion engage the teeth of said rack to slide said rack in said slot upon rotation of said pinion.

5. An apparatus according to claim 4, wherein said opening for said pinion is circular and has a clearance fit with said connection portion of said pinion such that said circular opening functions as a bearing for said pinion, and said slot has an end portion in which said rack is positionable so as to be physically clear of said pinion.

* * * * *